US008948390B2

(12) United States Patent
Scott et al.

(10) Patent No.: US 8,948,390 B2
(45) Date of Patent: Feb. 3, 2015

(54) SECURELY JOINING A SECURE WIRELESS COMMUNICATIONS NETWORK

(71) Applicant: Microsoft Corporation, Redmond, WA (US)

(72) Inventors: James Scott, Cambridge (GB); Alice Jane Bernheim Brush, Bellevue, WA (US); Ratul Mahajan, Seattle, WA (US); Stephen Hodges, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 195 days.

(21) Appl. No.: 13/631,986

(22) Filed: Sep. 29, 2012

(65) Prior Publication Data

US 2014/0093079 A1 Apr. 3, 2014

(51) Int. Cl.
*H04L 29/06* (2006.01)
*H04W 12/04* (2009.01)
*H04W 12/08* (2009.01)

(52) U.S. Cl.
CPC ............. *H04W 12/04* (2013.01); *H04L 63/061* (2013.01); *H04W 12/08* (2013.01)
USPC .......................................................... 380/270

(58) Field of Classification Search
CPC ..... H04W 12/04; H04W 12/08; H04L 63/061
USPC .......................................................... 380/270
See application file for complete search history.

(56) References Cited

U.S. PATENT DOCUMENTS 7,185,199 B2 * 2/2007 Balfanz et al. ................ 713/168
7,443,807 B2 * 10/2008 Cutler ........................... 370/254
7,581,096 B2 8/2009 Balfanz et al.
7,634,802 B2 * 12/2009 Chiloyan .......................... 726/4
7,882,238 B2 * 2/2011 Burns et al. .................. 709/227
7,926,092 B2 4/2011 Abujbara et al.
7,975,140 B2 * 7/2011 Fedyk et al. ................. 713/171
8,196,188 B2 6/2012 Wynn et al.
8,271,786 B1 * 9/2012 Pradhan et al. ............... 713/169
2003/0149874 A1 * 8/2003 Balfanz et al. ................ 713/168
2006/0116890 A1 * 6/2006 Nakamura et al. ................ 705/1

(Continued)

OTHER PUBLICATIONS

"Wi-Fi Certified™ for Wi-Fi Protected Setup: Easing the User Experience for Home and Small Office Wi-Fi® Networks", In the White Paper of Wi-Fi Alliance, Jan. 1, 2007, 14 pages.

(Continued)

*Primary Examiner* — Michael S McNally

(74) *Attorney, Agent, or Firm* — Miia Sula; Micky Minhas; Zete Law, P.L.L.C.

(57) ABSTRACT

Securely joining a secure wireless communications network is described, for example, where a printer or other device is securely added to a home wireless network. In various embodiments, a temporary wireless network is established between a new joiner device and a second wireless communications device which is already a member of a secure home wireless network. In an example, the temporary wireless network is set up using a secret key known to the new joiner device and the second wireless communications device by virtue of physical proximity. In various examples, the secure, temporary wireless network is used to transfer credentials of the secure home network to the new joiner device which then joins the home network. In an example the temporary wireless network is cancelled once the new joiner device becomes a member of the secure home (or other) wireless network.

20 Claims, 6 Drawing Sheets

(56) References Cited

U.S. PATENT DOCUMENTS

| | | | | |
|---|---|---|---|---|
| 2006/0180658 | A1 | 8/2006 | Anderson | |
| 2006/0293028 | A1* | 12/2006 | Gadamsetty et al. | 455/411 |
| 2007/0229670 | A1* | 10/2007 | Soga | 348/211.2 |
| 2008/0141347 | A1 | 6/2008 | Kostiainen et al. | |
| 2009/0052667 | A1* | 2/2009 | Iwamura | 380/200 |
| 2009/0227282 | A1 | 9/2009 | Miyabayashi et al. | |
| 2010/0095359 | A1* | 4/2010 | Gordon | 726/6 |
| 2012/0045059 | A1* | 2/2012 | Fujinami | 380/273 |
| 2014/0059351 | A1* | 2/2014 | Braskich et al. | 713/171 |

OTHER PUBLICATIONS

Thomas, et al., "Thingies for Dummies: A Smart Home Infrastructure for the Rest of us", Retrieved on: Aug. 2, 2012, Available at: https://blog.itu.dk/SPCL-F2012/files/2012/06/5thingiesfordummies.pdf.

"Wi-Fi Protected Setup", Published on: Feb. 5, 2009, Available at: http://en.wikipedia.org/wiki/Wi-Fi__Protected__Setup.

Honig, Zach, "Belkin WeMo Switch and Motion Home Automation System for iOS Hands-on (Video)", Published on: Jul. 4, 2012, Available at: http://www.engadget.com/2012/07104/belkin-wemo-hands-on/.

Brown, et al., "MultiNet: Usable and Secure WiFi Device Association", SIGCOMM Aug. 13, 2012 Available at: http://conferences.sigcomm.org/sigcomm/2012/paper/sigcomm/p275.pdf.

Yang and Edwards, "ICEbox: Toward Easy-to-Use Home Networking," Proceedings of the Eleventh IFIP International Conference on Human-Computer Interaction (Interact 2007). Rio de Janeiro, Brazil. Sep. 10-14, 2007 Available at: http://www.cc.gatech.edu/~keith/pubs/icebox-interact.pdf.

* cited by examiner 104 200

| New joiner | Hub |
|---|---|
| Make new joiner key available (300) | |
| | Receive new joiner key (302) |
| | Set up second wireless network (304) |
| Detect second wireless network and connect to it (306) | |
| | Receive new joiner on second wireless network (308) |
| | Send encrypted credentials of first secure wireless network to new joiner (310) |
| Receive encrypted credentials of first secure wireless network (312) | |
| Connect to first wireless network using credentials (314) | |
| | Receive new joiner on first secure wireless network (316) |
| | Delete second secure wireless network (318) |
| Send description of new joiner device to Hub over first secure wireless network (320) | |
| | Further configuration of first secure wireless network with respect to new joiner (322) |

| New joiner | Hub | |
|---|---|---|
| | Set up "discovery" wireless network with no security | 400 |
| 402 On power up, look for and find discovery network | | |
| 404 Send notification of new joiner presence to hub over discovery network | | |
| | Receive notification of new joiner presence and request new joiner key from user | 406 |

FIG. 4

SECURELY JOINING A SECURE WIRELESS COMMUNICATIONS NETWORK

BACKGROUND

Some existing approaches for enabling a device such as a printer, camera, domestic appliance, light switch or other device with wireless communications capability to join an existing secure wireless network, such as a home wireless network, suffer from security flaws. Brute force attacks may succeed or secure credentials may be sent over open wireless networks. Other approaches are time consuming, complex or cumbersome for users. For example, there may be a need to manually enter security keys having many digits, a need to use a temporary wired connection or to push buttons on a network router or on the device to be connected to the network.

The embodiments described below are not limited to implementations which solve any or all of the disadvantages of known processes for securely joining a secure wireless communications network.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Securely joining a secure wireless communications network is described, for example, where a printer or other device is securely added to a home wireless network. In various embodiments, a temporary wireless network is established between a new joiner device and a second wireless communications device which is already a member of a secure home wireless network. In an example, the temporary wireless network is set up using a secret key shared by the new joiner device and the second wireless communications device by virtue of physical proximity. In various examples, the temporary wireless network is used to transfer credentials of the secure home network to the new joiner device which then joins the home network. In an example the temporary wireless network is cancelled once the new joiner device becomes a member of the secure home (or other) wireless network.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein:

FIG. 3 is a sequence chart of a process for enabling a new joiner device to join a secure wireless network;

FIG. 4 is a sequence chart of a discovery process for use with the process of FIG. 3;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a home wireless communications network, the system described is provided as an example and not a limitation. As those skilled in the art will appreciate, the present examples are suitable for application in a variety of different types of wireless communications networks.

Figure 1:
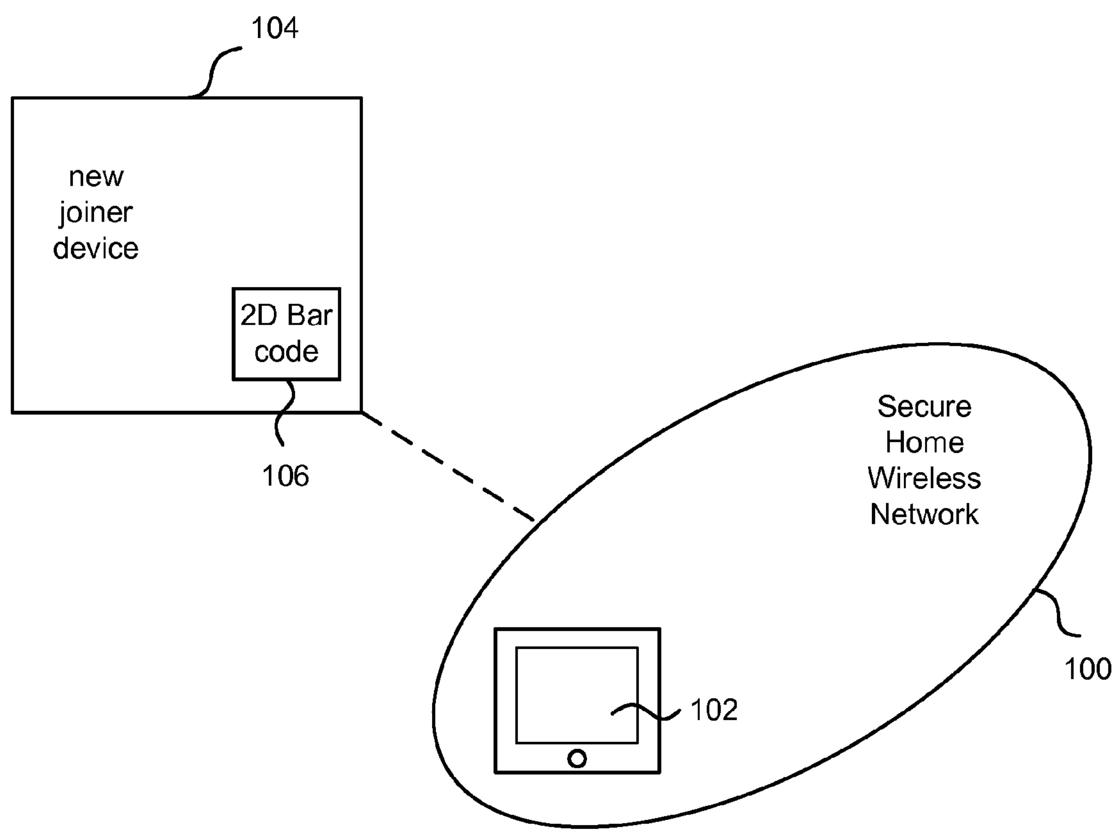
FIG. 1 is a schematic diagram of a secure home wireless network and a new joiner device which desires to join the secure home wireless network.

FIG. 1 is a schematic diagram of a secure home wireless network and a new joiner device which desires to join the secure home wireless network. In this example the secure wireless network is a home or domestic network although this is an example only; other types of secure wireless network may be used. A secure wireless network comprises one or more entities (also referred to as nodes of the network) arranged to communicate wirelessly with one another. In a secure wireless network the communications between entities in the network are encrypted using a cryptographic key known only to the entities in the network. The cryptographic key may also be referred to as a passcode and may comprise a list of integers such as a 16 or higher (or lower) digit number. The secure home wireless network may be one which conforms to the IEEE 802.11 family of standards for implementing wireless local area networks (WLANs) or may be of any other type which is secure. The secure wireless network may have a publicly available identifier such as an SSID or any other publicly available identifier. Each of the entities in the secure wireless network has credentials of the secure wireless network where the credentials comprise at least the cryptographic key mentioned above.

The new joiner device 104 comprises a wireless communications interface which enables it to communicate wirelessly with other entities. It may also have a 2D bar code 106 or other mechanism for making a secret key available to physically proximate entities. A non-exhaustive list of examples of new joiner devices is: printer, camera, smart home controller, web cam, domestic appliance, home automation sensor or actuator. The new joiner device may have a graphical user interface but that is not essential. In some examples the new joiner device has a limited user interface or no user interface.

The secure home wireless network 100 comprises a second wireless communications device 102 such as a portable computing device, smart phone, home router or other device having a wireless communications interface that enables it to communicate wirelessly with other entities. The second wireless communications device 102 is a member of the secure home wireless network 100 or other secure wireless network. As the second wireless communications device 102 is a member of the secure home wireless network 100 it has, or has access to, the credentials of the secure home wireless network. In some examples the credentials of the secure home wireless network are known to the device but, due to the configuration of an operating system at the device, cannot be displayed to a user of the device.

In some examples, the second wireless communications device 102 has a 2D bar code or other mechanism for making a secret key available to physically proximate entities. In this case, the new joiner device 104 does not need to have its own 2D bar code 106 or other mechanism for making a secret key available to physically proximate entities.

Either the new joiner device 104, or the second wireless communications device 102 (or both of them) is capable of acting as a wireless access point or providing wireless access point functionality by remotely controlling another device. A wireless access point is a device which facilitates the exchange of data over a wireless network, between itself and other devices, using a set of credentials (for example, a public network identifier and optionally a key) to identify that network, and optionally to enable the other devices to connect to a further wireless or wired network of which the access point is a member. Credentials of a wireless network (for example, a public network identifier and optionally a key) may be transferred between entities using any suitable communications protocol such as user datagram protocol (UDP) unicast or broadcast, or hyper text transfer protocol (HTTP). In some examples the device which provides a wireless access point has facility to provide two (or more) independent wireless communications networks at the same time. When the new joiner device 104 has capability to be a wireless access point (either itself or by remote control) it may act in the role of a wireless communications server. When the new joiner device 104 does not have wireless access point capability it may act in the role of a wireless communications client. In some examples the new joiner device takes a wireless server role and the second communications device 102 takes a wireless client role; in other examples the new joiner takes a wireless client role and the second communications device takes a wireless server role.

The new joiner device 104 desires to join the secure home wireless network 100 in a secure manner; that is, without compromising the credentials of the secure home wireless network. This is achieved by enabling the new joiner device 104 and the second wireless communications device 102 to be members of a temporary wireless network as now described.

Figure 2:
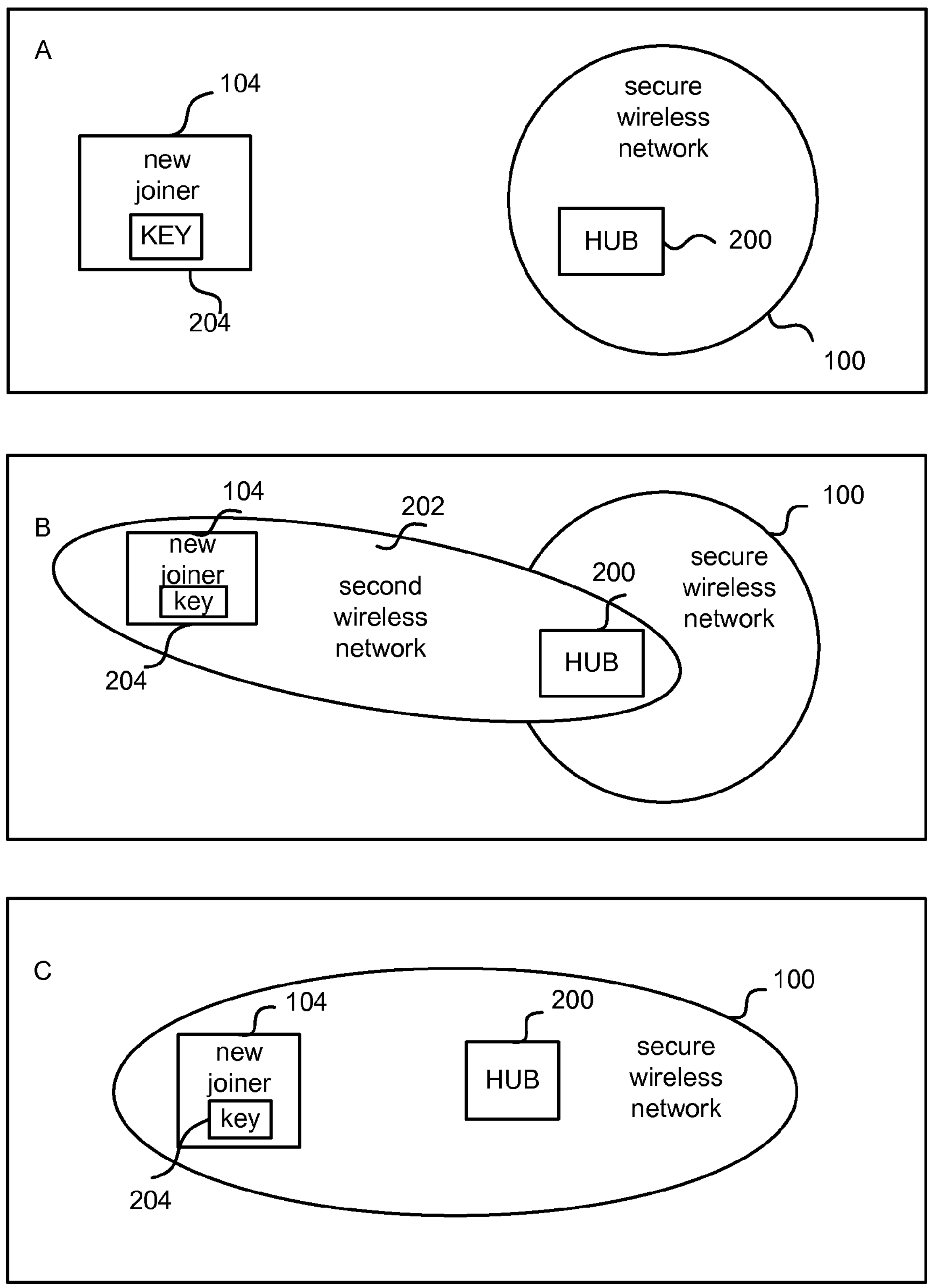
FIG. 2 is a schematic diagram of stages whereby a new joiner device joins a secure wireless network.

Part A of FIG. 2 illustrates a situation where a new joiner device 104 desires to join a secure wireless network 100. A second wireless communications device, referred to as a hub 200, is a member of the secure wireless network 100. Hub 200 is an example of a second wireless communications device. As mentioned above either the new joiner device 104 or the hub 200 has a 2D bar code or other mechanism for making a secret key 204 available to physically proximate entities. (In FIG. 2 the key 204 is shown at the new joiner 104 but it could equally well be at the hub 200.) The key is a cryptographic key suitable for securing a wireless communications network. It may be generated by the new joiner or hub "on the fly" (i.e. be different at each time of use), generated and stored by the new joiner device or hub the first time the device is powered, or may be assigned to the new joiner device or hub during manufacturing.

The hub 200 is physically proximate to the new joiner device and the key 204 is shared between the new joiner device and the hub. This sharing is achieved in any way which depends on the physical proximity of the new joiner device 104 and the hub 200. For example, the key may be written on a label on the new joiner device (or hub) and the user may manually type the number into the hub 200 (or new joiner device). In another example the key is encoded in an optically machine readable representation such as a barcode which may be a 1D, 2D or higher dimensional barcode on the device (or hub). The user may use a camera on the hub 200 or new joiner (which may be a camera phone) to capture the 2D barcode. The 2D barcode may encode other information as well as the key, for example, an SSID or other public identifier of a wireless communications network, a universal resource locator (URL) or other address of a web page associated with the new joiner device or hub. The 2D barcode may be decoded at the hub or new joiner device to extract the information it contains such as the secret key and optional additional information such as an SSID and URL.

In another example the key is shared by transmission between the new joiner device 104 and the hub 200 using near-field communications. Near-field communications are radio communications between devices which rely on close physical proximity, (for example, touching or a few centimeters apart) between devices. The near-field communications between the new joiner device and the hub may be unidirectional (from the new joiner to the hub or vice versa) or bidirectional.

In some examples the key is shared by transmission between the new joiner device 104 and the hub 200 using a light pulse stream. In this case the new joiner device (or hub) has at least one light source to generate the light pulse stream. The light pulse stream may be emitted continuously, at intervals, or on user request (such as by a button push or other user input event at the device). The key (and optional additional information) is encoded in the light pulse stream using an encoding technique which is known to both the hub and the new joiner device. The hub 200 (or new joiner device) comprises at least one light sensor which is able to capture a sequence of light pulses emitted by the new joiner device (or hub). The light may be visible to humans or may be infra-red or other illumination that is not visible to humans. The hub 200 (or new joiner device) is arranged to decode the sequence of light pulses to extract the key and optional additional information.

In some examples the key is shared between the hub and new joiner using an audio signal in which the key and optional additional information is encoded. The audio signal may be emitted continuously, at intervals, or on user request (such as by a button push or other user input event at the device). The new joiner device (or hub) may have a loudspeaker to emit the audio signal and the hub (or new joiner device) may have a microphone to capture the audio signal. The hub (or new joiner device) is able to decode the audio signal to obtain the key and optional additional information. The audio signal may use a frequency range inaudible to humans.

As described above the key is shared between the new joiner device and the hub without using an open communications network (one which is not secure) to transfer the key. This avoids so called "man in the middle" attacks where a third party intercepts information being transferred between two entities. Because the new joiner device is physically proximate to the hub the risk of revealing the key to non-trusted entities is reduced; that is, entities physically proximate to the new joiner device (or hub) are trusted.

As shown in part B of FIG. 2 a second wireless network 202 is established between the new joiner device 104 and the hub 200. This second wireless network may be temporary with respect to the secure wireless network 100 such as the home wireless network. In some examples the second wireless network 202 is itself a secure wireless network. In other examples it is an open (non-secured) wireless network.

The second wireless network 202 may either be set up by the new joiner 104 when it has wireless access point capability, or may be set up by the hub when it has wireless access point capability. An example is now described with reference to parts B and C of FIG. 2 where the new joiner device 104 has wireless access point capability and where the second wireless network 202 is secure.

The new joiner device 104 creates a second secure wireless network 202 which may be temporary relative to the secure wireless network 100. The new joiner device may create the second secure wireless network so that it is secured using the key 204 shared by the new joiner and the hub. The hub 200 detects the second secure wireless network 202. For example, it may look for any wireless networks that are in wireless communications range and try to connect to those using the key 204. If the hub 200 knows when it shared the key (for example, where near-field communications are used or when a user input event triggers the key sharing) then it may search for any new wireless networks which it detects within a time window of key sharing. If a network is found during the time window the hub tries to connect to that using the key 204. Alternatively, the network's SSID or public identifier may be well-known, e.g. the SSID "setup" might be used automatically by both the new joiner and the hub.

In some examples the new joiner makes the key available together with an SSID or other public identifier for a wireless network. In this case the new joiner may generate the second secure wireless network 202 using the key and assign the public identifier to the second secure wireless network. The hub is then able to monitor for wireless networks with the public identifier shared by the new joiner. When it finds a wireless network with that identifier it connects to it using the key 204.

Once the second secure wireless network 202 is established (as illustrated in part B of FIG. 2) between the new joiner 104 and the hub 200 the hub sends the credentials of the secure wireless network 100 (such as the home network) to the new joiner device. The credentials are sent over the second secure wireless network 202 rather than over an open (unsecured network). The new joiner 104 may use the credentials to join the secure wireless network 100 (such as the home network). The second secure wireless network may then be terminated by the new joiner device and the situation is as illustrated in part C of FIG. 2.

The process described above with reference to FIG. 2 enables the new joiner device to securely join the secure wireless network 100 without the need to make and maintain an independent secure wireless network per new joiner device. The second wireless network 202 may be terminated once the new joiner device has the credentials of the secure wireless network 100. This avoids littering the wireless communications space with many networks, which may be visible to other nearby devices and cause inconvenience to users of those devices who are trying to browse a list of networks since that list may grow very long.

FIG. 3 is a sequence chart of a process for enabling a new joiner device 104 to join a secure wireless network. In this example the new joiner device acts as a client and the hub as a server; that is, in this example the hub has wireless access point capability. In this example the second wireless network is open rather than secure. Actions or events at the new joiner device 104 are shown in the left hand column of the chart. Actions or events at a hub 200 which is a member of the secure wireless network which the new joiner desires to join are shown in the right hand column of the chart. The relative vertical position of the actions in the chart represents the relative chronological order of the actions or events.

The new joiner device 104 makes 300 it's secret key available to the hub 200. The key is as described above with reference to FIG. 2 and the new joiner device 104 shares the key using any method which depends on physical proximity between the new joiner device and the hub as described above. The hub 200 receives 302 the key and sets up 304 a second wireless network which is open. The new joiner 104 detects 306 the second wireless network and connects to it as it is an open wireless network. The hub receives 308 (or detects the presence of) the new joiner on the second wireless network and sends 310 the credentials of the first secure wireless network to the new joiner. It encrypts the credentials of the first secure wireless network using the key and sends the encrypted credentials over the open second wireless network to the new joiner device. The new joiner device is able to decrypt the credentials using the key.

The new joiner 104 receives 312 the encrypted credentials of the first secure wireless network, decrypts those using the key, and connects 314 to the first secure wireless network using the credentials. The hub 200 receives 316 (or detects the presence of) the new joiner on the first secure wireless network and terminates 318 the second secure wireless network. In some examples the new joiner may use the second secure wireless network to explicitly signal to the hub that it has received the credentials. This may happen before the new joiner has joined the first secure wireless network so that the second secure wireless network may be terminated before the new joiner becomes part of the first secure wireless network. Optionally the new joiner sends 320 a description of itself to the hub 200 over the first secure wireless network and the hub 200 carries out further configuration 322 of the first secure wireless network with respect to the new joiner.

In some examples a discovery phase is used prior to the method of FIG. 3 although this is not essential. An example discovery phase is now described with reference to FIG. 4. The discovery phase provides a process for the hub to detect or discover the presence of the new joiner device in its proximity. Actions or events at the new joiner device 104 are shown in the left hand column of the chart of FIG. 4. Actions or events at a hub 200 which is a member of the secure wireless network which the new joiner desires to join are shown in the right hand column of the chart. The relative vertical position of the actions in the chart represents the relative chronological order of the actions or events.

The hub 200 sets up 400 a wireless network with no security. The new joiner device 104 is arranged so that when it powers up it looks for 402 wireless networks which are in communications range. It may send 404 a notification of its presence to all the wireless networks it finds. Alternatively it may select one or more of the wireless networks it finds and send 404 a notification only to those selected wireless networks. Selection may be made on the basis of a well-known network identifier (or element of a network identifier), e.g. SSID starting with "setup". The hub 200 receives 406 notification of the presence of the new joiner and requests the key. The request for the key may be made to a user by displaying a request at a graphical user interface or other user interface at the hub 200, at the new joiner 104 or at another device in communication with the hub. The request may be made by sending a message to the user from the hub, for example an email message, short message service message, voice mail message or other message or by displaying a request at a web site associated with the hub or new joiner device. In other examples the hub 200 already has the key but the new joiner device does not. In that situation the hub shares the key with the new joiner device using any of the methods described above.

When the user receives the request the user is able to obtain the key from the new joiner device 104 as described above. For example, by moving the hub (which may be a camera phone) to the new joiner device and capturing an image of a 2D barcode on the new joiner device. This is one example only. The user may position the hub and/or new joiner device so that the key maybe shared using light pulses, audio, near-field communications or in other ways relying on physical proximity.

As mentioned above, either the new joiner device 104, or the second wireless communications device 102 (or both of them) is capable of acting as a wireless access point or providing wireless access point functionality by remotely controlling another device. For example, where the second wireless communications device is a smart phone which does not support access point mode it may control a router or other node in the secure home wireless network 100 which does support access point mode. The other node may be instructed to add the second wireless network temporarily. In another example the other node is instructed to replace the first secure wireless network by the second wireless network temporarily, for the short duration of the credentials transfer. This is useful where the other node supports one wireless network at a time and is unable to provide two or more wireless networks independently and simultaneously.

In a similar manner other aspects of the process at the second wireless communications device (or hub) may also be carried out through remote control of another node in the first secure wireless network.

Various aspects of the process at the second wireless communications device (or hub) may be carried out manually by a user who follows instructions that may be provided on a web page associated with the device or at a graphical user interface at the device. For example, the hub may not have control over which wireless network to join and so, in order to join the second wireless network (where that is set up by the new joiner in access point mode), a user may be prompted to input credentials for the second wireless network. For example, a user may type in an SSID and key pair specified by the new joiner device or a user may scan a 2D bar code comprising an SSID and key pair of the second wireless network.

Figure 5:
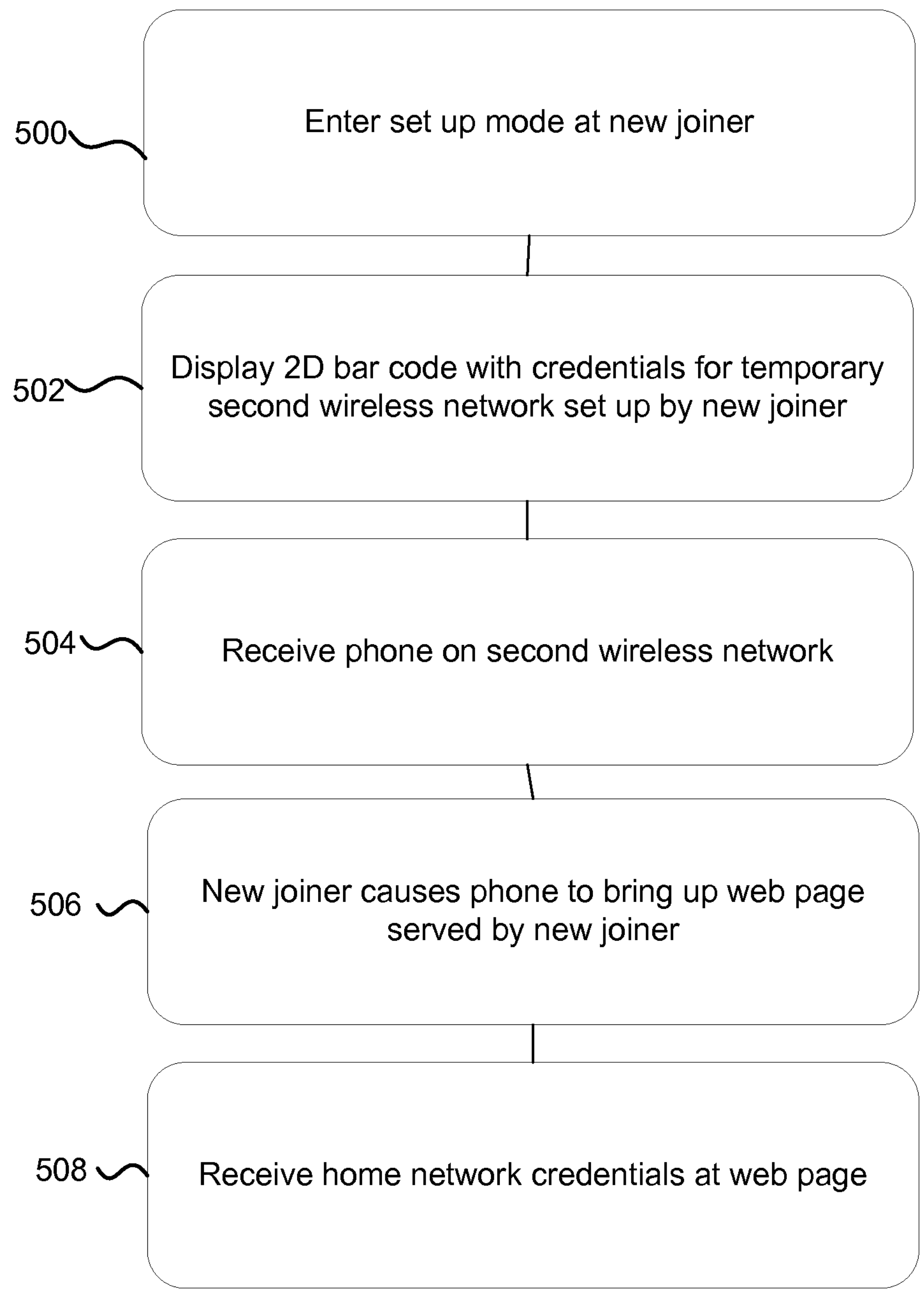
FIG. 5 is a flow diagram of a method at a new joiner device which has wireless access point capability.

As mentioned above a temporary second wireless communications network may be used to securely transfer credentials of a secure first communications network to a new joiner device. In some examples the temporary second wireless communications network is itself secure. In some examples the temporary second wireless communications network is open and the credentials are encrypted before being sent over the open network. In some examples, such as where the new joiner device has a limited user interface, the new joiner device may serve its own web page at which a web form is provided to enable a user to enter credentials of the first secure wireless communications network. This is now described with reference to FIG. 5.

In this example, a user has recently bought a new printer and would like to connect the printer to his or her secure home wireless network. The new joiner device (in this case the printer) enters 500 a set up mode as it is powered on for the first time or as a result of user input. The new joiner device displays 502 a 2D bar code with credentials for a temporary second wireless network that the new joiner device sets up. For example, the printer prints a page with a 2D bar code comprising wireless network credentials for the second wireless network. The second wireless network is a secure network in this example, secured using a key in the 2D bar code. The key is shared with a second wireless communications device (such as a smart phone in this example) which is on the home network. The sharing may be achieved by a user pointing his or her phone at the 2D bar code and the phone capturing an image of the 2D bar code. The phone uses the details in the 2D bar code to join the second wireless network and is received 504 on that network. The printer (or other new joiner) sends instructions to the phone over the secure second wireless network which causes 506 the phone to bring up a web page served by the new joiner device. For example, this is achieved using captive portal, directory number service (DNS)/hyper text transfer protocol (HTTP) redirection to make the phone bring up a webpage served by the printer. Captive portal redirection is a process whereby an http client is forced to bring up a specified webpage, usually, though not in this case, as a prerequisite to accessing the internet. The webpage may comprise a web form for the user to enter the home network credentials. The user may enter the details by making input at the phone. The home network credentials are received 508 at the web page and so made available to the printer in a secure manner.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Figure 6:
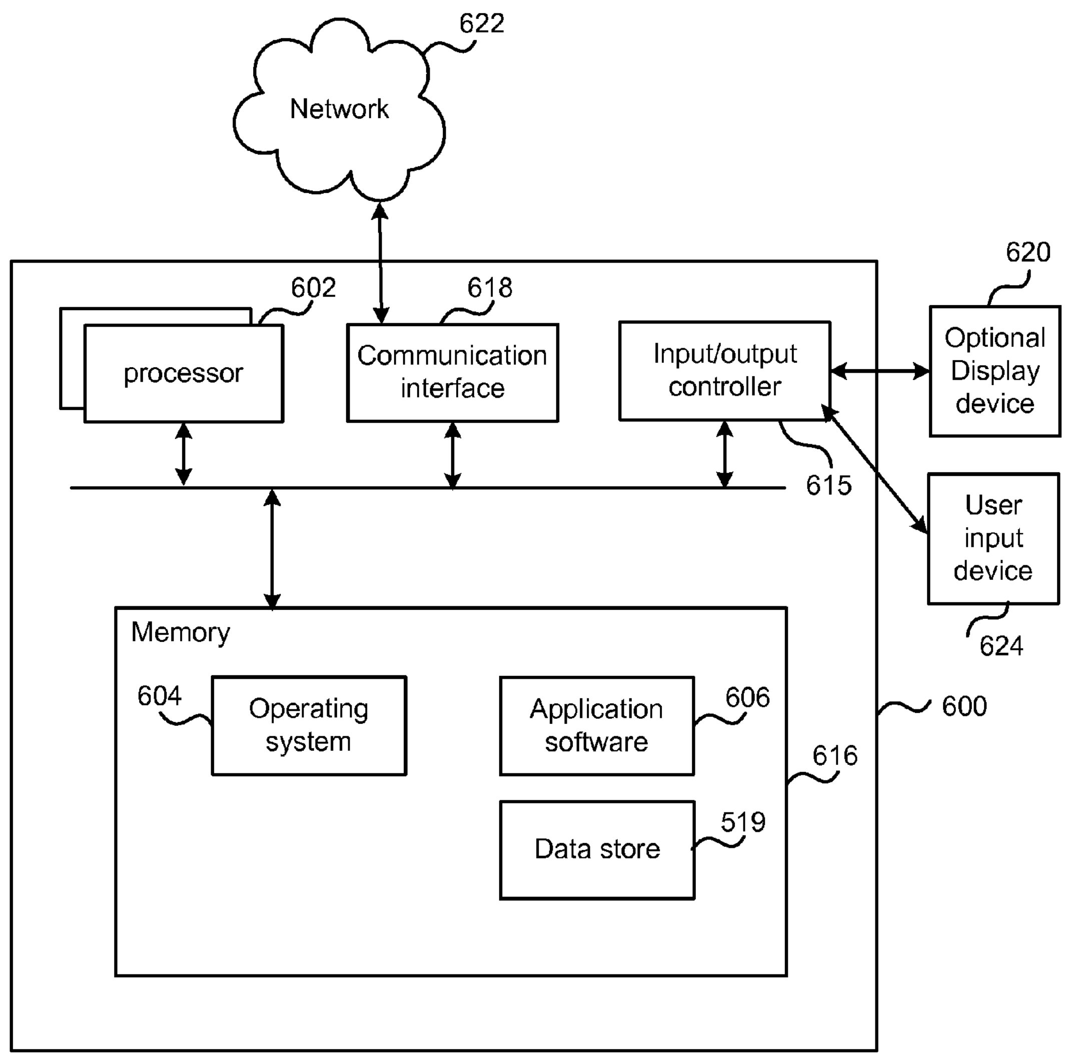
FIG. 6 illustrates an exemplary computing-based device in which embodiments of a node of a secure communications network may be implemented.

FIG. 6 illustrates various components of an exemplary computing-based device 600 which may be implemented as any form of a computing and/or electronic device, and in which embodiments of a node in a secure wireless communications network may be implemented.

Computing-based device 600 comprising a communications interface 618 which enables wireless communication with other entities. The communications interface may also be suitable to set up at least one secure wireless network and optionally to simultaneously provide two or more secure wireless networks that are independent of one another.

Computing-based device 600 comprises one or more processors 602 which may be microprocessors, controllers or any other suitable type of processors for processing computer executable instructions to control the operation of the device in order to function as a node in a secure wireless network. In some examples, for example where a system on a chip architecture is used, the processors 602 may include one or more fixed function blocks (also referred to as accelerators) which implement a part of the method of any of FIGS. 3, 4 and 5 in hardware (rather than software or firmware). Platform software comprising an operating system 604 or any other suitable platform software may be provided at the computing-based device to enable application software 606 to be executed on the device. A data store 619 may store cryptographic keys, time windows, wireless network identifiers or other information.

The computer executable instructions may be provided using any computer-readable media that is accessible by computing based device 600. Computer-readable media may include, for example, computer storage media such as memory 616 and communications media. Computer storage media, such as memory 616, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 616) is shown within the computing-based device 600 it will be appreciated that the storage may be distributed or located remotely and accessed via a network or other communication link (e.g. using communication interface 618).

The computing-based device 600 also comprises an input/output controller 615 arranged to output display information to an optional display device 620 which may be separate from or integral to the computing-based device 600. The display information may provide a graphical user interface. The input/output controller 615 is also arranged to receive and process input from one or more devices, such as a user input device 624 (e.g. a mouse, keyboard, camera, microphone or other sensor). In some examples the user input device 624 may detect voice input, user gestures or other user actions and may provide a natural user interface (NUI). This user input may be used to input a key, a 2D barcode or other information. In an embodiment the display device 620 may also act as the user input device 624 if it is a touch sensitive display device. The input/output controller 615 may also output data to devices other than the display device, e.g. a locally connected printing device.

The input/output controller 615, display device 620 and optionally the user input device 624 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of securely adding a new joiner wireless communications device to a first secure wireless network comprising at the new joiner device:
sharing a secret key with a second wireless communications device which is physically proximate to the new joiner device, the second wireless communications device being a member of the first secure wireless network;
detecting a second wireless network;
connecting to the second wireless network;
receiving credentials of the first secure wireless network from the second wireless communications device over the second wireless network in a secure manner according to the secret key; and at least one of
searching, when the new joiner device powers on, for a third wireless network and sending a notification of the presence of the new joiner device to the second wireless communications device over the third wireless network, or
detecting the second wireless network by searching for wireless networks during a time window around sharing the key.

2. A method as claimed in claim 1 wherein detecting the second wireless network comprises detecting a wireless network which is secure by virtue of the secret key.

3. A method as claimed in claim 1 wherein receiving credentials of the first secure wireless network comprises receiving the credentials encrypted using the secret key.

4. A method as claimed in claim 1 wherein sharing the key comprises using a process which depends on the physical proximity of the new joiner device and the second wireless communications device.

5. A method as claimed in claim 1 wherein sharing the key comprises displaying a barcode comprising at least the secret key.

6. A method as claimed in claim 1 wherein sharing the key comprises transmitting the key using near-field communications.

7. A method as claimed in claim 1 wherein sharing the key comprises emitting a light pulse stream encoding the key.

8. A method as claimed in claim 1 wherein sharing the key comprises emitting an audio signal encoding the key.

9. A method as claimed in claim 1 comprising, when the new joiner device powers on, searching for the third wireless network and sending the notification of the presence of the new joiner device to the second wireless communications device over the third wireless network.

10. A method as claimed in claim 1 comprising detecting the second wireless network by searching for wireless networks during the time window after sharing the key.

11. A method at a node which has credentials of a first secure wireless network comprising:
sharing a secret key with a physically proximate new joiner device which desires to securely join the first secure wireless network;
setting up a second wireless network;
receiving the new joiner device on the second wireless network; and
sending credentials of the first secure wireless network to the new joiner device over the second wireless network in a secure manner according to the secret key; and at least one of:
receiving the new joiner device further comprising detecting a search for the second wireless network by the joining device during a time window around sharing the key, or
setting up a third wireless communications network without security, receiving notification of presence of the new joiner device over the third wireless communications network, and displaying a request at a graphical user interface for the key from the new joiner device.

12. A method as claimed in claim 11 wherein the second wireless network and the first secure wireless network are independent and are provided by the node at the same time.

13. A method as claimed in claim 11 wherein setting up the second wireless network comprises remotely controlling another node in the first secure wireless network which has wireless access point capability.

14. A method as claimed in claim 11 comprising sharing the key in a manner dependent on physical proximity of the node and the new joiner device.

15. A method as claimed in claim 11 comprising setting up a the third wireless communications network without security; receiving notification of presence of the new joiner device over the third wireless communications network; and
displaying the request at the graphical user interface for the key from the new joiner device.

16. A method as claimed in claim 11 at least partially carried out using hardware logic.

17. A method of securely adding a new joiner wireless communications device to a first secure wireless network comprising at the new joiner device:
sharing a secret key with a second wireless communications device which is physically proximate to the new joiner device, the second wireless communications device being a member of the first secure wireless network;
setting up a second wireless network secured using the secret key;
receiving the second wireless communications device on the second wireless network;
sending instructions to the second wireless communications device, over the second wireless network, to cause the second wireless communications device to display a web page served by the new joiner device, the web page requesting credentials of the first secure wireless network; and
at least one of
searching, when the new joiner device powers on, for a third wireless network and sending a notification of the presence of the new joiner device to the second wireless communications device over the third wireless network, or
detecting the second wireless network by searching for wireless networks during a time window around sharing the key.

18. A method as claimed in claim 17 comprising receiving credentials of the first secure wireless network at the new joiner device from the web page served by the new joiner device.

19. A method as claimed in claim 18 comprising terminating the second wireless network after receiving the credentials of the first secure wireless network.

20. A method as claimed in claim 17 comprising using captive portal redirection to cause the second wireless communications device to display the webpage.

* * * * *